(12) United States Patent
Yamauchi et al.

(10) Patent No.: US 10,259,731 B2
(45) Date of Patent: Apr. 16, 2019

(54) SLUDGE TREATMENT SYSTEM AND SLUDGE TREATMENT METHOD

(71) Applicant: Mitsubishi Electric Corporation, Chiyoda-ku (JP)

(72) Inventors: Tokiko Yamauchi, Chiyoda-ku (JP); Makoto Takata, Chiyoda-ku (JP); Hiroshi Kuroki, Chiyoda-ku (JP); Nozomu Yasunaga, Chiyoda-ku (JP); Seiji Furukawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 261 days.

(21) Appl. No.: 15/122,335

(22) PCT Filed: Apr. 10, 2015

(86) PCT No.: PCT/JP2015/061233
§ 371 (c)(1),
(2) Date: Aug. 29, 2016

(87) PCT Pub. No.: WO2015/166784
PCT Pub. Date: Nov. 5, 2015

(65) Prior Publication Data
US 2016/0368797 A1 Dec. 22, 2016

(30) Foreign Application Priority Data
Apr. 29, 2014 (JP) .................. 2014-093234

(51) Int. Cl.
*C02F 3/00* (2006.01)
*B01F 5/04* (2006.01)
(Continued)

(52) U.S. Cl.
CPC .......... *C02F 3/006* (2013.01); *B01F 3/04503* (2013.01); *B01F 5/04* (2013.01);
(Continued)

(58) Field of Classification Search
CPC ............... C02F 3/00; C02F 3/006; C02F 3/12
(Continued)

(56) References Cited

U.S. PATENT DOCUMENTS 5,147,563 A * 9/1992 Long, Jr. ............... B01F 3/0473
210/758
5,248,419 A * 9/1993 Long, Jr. ............... B01F 3/0473
210/218
(Continued)

FOREIGN PATENT DOCUMENTS

CN 1247472 C 3/2006
CN 101516791 A 8/2009
(Continued)

OTHER PUBLICATIONS

International Search Report dated Jul. 14, 2015 in PCT/JP15/061233 Filed Apr. 10, 2015.
(Continued)

*Primary Examiner* — Ellen M McAvoy
(74) *Attorney, Agent, or Firm* — Oblon, McClelland, Maier & Neustadt, L.L.P.

(57) ABSTRACT

An ozone treatment apparatus includes: an ozone gas generator that generates ozone gas from raw material gas; a sludge pump that pressurizes sludge to be treated; an ejector in which the sludge to be treated, which is pressurized by the sludge pump, is injected; and a valve provided between the ozone gas generator and the ejector. The valve becomes in an open state when pressure on the former stage side is larger than pressure on the latter stage side by a specified value or higher. An ozone gas storage facility may be provided between the ozone gas generator and the valve. A sludge mixing tank installed in the latter stage of the ejector and a (Continued)

sludge circulation pump that connects an upper part of the sludge mixing tank and the latter stage of the sludge pump may be provided.

15 Claims, 13 Drawing Sheets

(51) Int. Cl.
| | |
|---|---|
| *C02F 3/12* | (2006.01) |
| *C02F 11/06* | (2006.01) |
| *B01F 15/00* | (2006.01) |
| *B01F 15/02* | (2006.01) |
| *B01J 7/00* | (2006.01) |
| *C01B 13/10* | (2006.01) |
| *B01F 3/04* | (2006.01) |
| *C02F 101/10* | (2006.01) |
| *C02F 103/00* | (2006.01) |
| *C02F 1/66* | (2006.01) |
| *C02F 1/78* | (2006.01) |
| *C02F 11/12* | (2019.01) |

(52) U.S. Cl.
CPC ...... *B01F 5/0428* (2013.01); *B01F 15/00357* (2013.01); *B01F 15/026* (2013.01); *B01J 7/00* (2013.01); *C01B 13/10* (2013.01); *C02F 3/12* (2013.01); *C02F 3/121* (2013.01); *C02F 3/1221* (2013.01); *C02F 3/1284* (2013.01); *C02F 11/06* (2013.01); *B01F 2003/04886* (2013.01); *B01F 2215/0052* (2013.01); *C01B 2201/64* (2013.01); *C02F 1/66* (2013.01); *C02F 1/78* (2013.01); *C02F 11/12* (2013.01); *C02F 2101/105* (2013.01); *C02F 2103/00* (2013.01); *C02F 2201/782* (2013.01); *C02F 2203/00* (2013.01); *C02F 2209/03* (2013.01); *C02F 2303/06* (2013.01); *C02F 2303/20* (2013.01); *C02F 2303/22* (2013.01); *C02F 2305/02* (2013.01); *Y02W 10/15* (2015.05)

(58) Field of Classification Search
USPC .................................................. 210/641, 741
See application file for complete search history.

(56) References Cited

U.S. PATENT DOCUMENTS

| | | | |
|---|---|---|---|
| 6,146,521 A * | 11/2000 | Yasui ........................ | C02F 1/78 |
| | | | 210/137 |
| 6,303,034 B1 | 10/2001 | Kamiya et al. | |
| 7,309,432 B1 * | 12/2007 | Fabiyi ..................... | C02F 3/006 |
| | | | 210/604 |
| 9,738,549 B2 * | 8/2017 | Novak ..................... | C02F 3/301 |
| 2003/0226803 A1 | 12/2003 | Kamiya et al. | |
| 2005/0145575 A1 * | 7/2005 | Yasunaga .................. | C02F 1/52 |
| | | | 210/721 |
| 2008/0105614 A1 * | 5/2008 | Fabiyi ....................... | C02F 3/12 |
| | | | 210/625 |
| 2008/0156742 A1 * | 7/2008 | McCrea .................... | C02F 1/78 |
| | | | 210/760 |
| 2010/0264081 A1 * | 10/2010 | Suzuki .................. | B01D 65/02 |
| | | | 210/605 |
| 2012/0223012 A1 * | 9/2012 | Gokcay ..................... | C02F 1/78 |
| | | | 210/620 |

FOREIGN PATENT DOCUMENTS

| | | |
|---|---|---|
| JP | 6-328099 A | 11/1994 |
| JP | 8-192196 A | 7/1996 |
| JP | 2005-46831 A | 2/2005 |
| JP | 2005-305441 A | 11/2005 |
| JP | 4373700 B2 | 11/2009 |
| JP | 2011-36837 A | 2/2011 |
| JP | 2013-226536 A | 11/2013 |

OTHER PUBLICATIONS

Office Action dated Sep. 20, 2018 in Chinese Patent Application No. 201580013090.0, citing documents AO and AP therein, 12 pages (with English language translation).

* cited by examiner

FIG. 16

|  | Average Suction per One Cycle (L/min) | Maximum Instantaneous Suction at Opening Time (L/min) |
|---|---|---|
| Open 1 sec.; Close 1 sec. | 0.44 | 6.0 |
| Open 1 sec.; Close 2 sec. | 0.27 | 6.5 |
| Open 2 sec.; Close 1 sec. | 0.40 | 6.0 |
| Open Constantly | 0.32 | — |

FIG. 17

|  | Average Suction per One Cycle (L/min) | Maximum Instantaneous Suction at Opening Time (L/min) |
|---|---|---|
| Just After Suction Portion, Open 2 sec.; Close 2 sec. | 0.61 | 6.0 |
| 1 m Away from Suction Portion, Open 2 sec.; Close 2 sec. | 0.92 | 13.5 |
| Just After Suction Portion, Open Constantly | 0.70 | — |

|  | MLSS Concentration of Treated Water (mg/L) |
|---|---|
| Open 1 sec.; Close 1 sec. (Ozone Gas Concentration 1 vol %) | 18900 |
| Open 1 sec.; Close 1 sec. (Ozone Gas Concentration 10 vol %) | 18500 |
| Open Constantly (Ozone Gas Concentration 1 vol %) | 19100 |

SLUDGE TREATMENT SYSTEM AND SLUDGE TREATMENT METHOD

TECHNICAL FIELD

The present invention relates to a sludge treatment system and a sludge treatment method.

BACKGROUND ART

In a water treatment field such as sewage treatment, there has been widely used an activated sludge method in which microorganisms are made to proliferate to metabolize and decompose organic matter in sewage. In water purifying treatment of the sewage by the activated sludge method, sludge flocs, in which the microorganisms and/or organic polymers are thickened in a very dense state, are formed. Sludge generated by excessive proliferation of the microorganisms is drawn from a reaction tank as excess sludge to become industrial wastes. The amount of residual of a sludge disposal field is depleted and disposal cost is soared; and accordingly, a reduction in the generation amount of sludge is needed. At present, there has been studied a reduction in sludge volume by means of solubilization treatment of solid components of the sludge and/or anaerobic digestion treatment of the sludge by chemical treatment that uses ozone and/or chemicals (for example, Patent Documents 1 to 5).

On the other hand, depletion of phosphate ore is apprehended and therefore reuse of phosphorus resources is emphasized. In a sewage treatment plant, as countermeasures against red tides and blue-green algae, phosphorus in sewage treated water is made to accumulate in the microorganisms and the phosphorus is removed from the sewage treated water as sewage sludge. Accordingly, a relatively high concentration of phosphorus is contained in the sewage sludge. If the anaerobic digestion treatment of the sludge is performed in order to reduce the generation amount of sludge, the phosphorus is eluted again from the excess sludge to form insoluble magnesium and phosphate (MAP) and to become scales. The scales block piping of an anaerobic digestion tank and accordingly it causes an impediment to the maintenance of facilities.

With the aim of a reduction in generation amount of sludge, there is proposed a method of performing solubilization treatment of the sludge by chemical treatment. In a treatment method of dissolving the sludge by using ozone-containing gas (hereinafter, referred to as "ozone gas") and alkali, the sludge is exposed to the ozone gas and then alkali is added to perform solubilization of the sludge solid components; and in the latter stage, phosphorus recovery treatment or anaerobic digestion treatment is performed to reduce the generation amount of sludge (e.g. Patent Document 1). Furthermore, after the ozone gas is mixed with the sludge, there is proposed a method of performing solubilization treatment of the sludge in a depressurized reaction tank (e.g. Patent Document 2). Further, there is proposed a method in which the ozone gas is mixed with the sludge by using an ejector to perform solubilization treatment of the sludge (e.g. Patent Document 3).

PRIOR ART DOCUMENT

Patent Document

Patent Document 1: Japanese Examined Patent Publication No. 4373700

Patent Document 2: Japanese Unexamined Patent Publication No. 2013-226536

Patent Document 3: Japanese Unexamined Patent Publication No. 2005-46831

Patent Document 4: Japanese Unexamined Patent Publication No. H8(1996)-192196

Patent Document 5: Japanese Unexamined Patent Publication No. 2005-305441

SUMMARY OF THE INVENTION

Problems to be Solved by the Invention

When the ozone treatment is performed on the sewage sludge and if it is not devised to penetrate the ozone gas into the inside of the sludge flocs, the ozone gas cannot be penetrated into the sludge flocs and the ozone, but is reacted with only the surface of the sludge solid components. Furthermore, when it is not devised to make pressure fluctuate in the case of mixing the ozone gas with the sludge, the sludge flocs cannot be physically crushed and the inside of the sludge flocs cannot be brought into contact with the ozone gas. As a result, dissolution of the sludge solid components is proceeded from the outside to the inside of the sludge flocs; and accordingly, a large amount of ozone and chemicals need to be added for the solubilization of the sludge solid components. Furthermore, if the sludge is solubilized by the ozone treatment, a phosphorus elution rate from the sludge increases; and accordingly, the scales are likely to be generated in the piping. Therefore, an object of the present invention is to increase the suction amount of ozone into sludge flocs in a sludge treatment system in order to solve the foregoing problem.

Means for Solving the Problems

According to the present invention, there is provided a sludge treatment system including: an ozone gas generator that generates ozone gas from raw material gas; a sludge pump that pressurizes sludge to be treated; an ejector in which the sludge to be treated, which is pressurized by the sludge pump, is injected; and a valve provided between the ozone gas generator and the ejector, wherein the valve becomes an open state when pressure on the former stage side is larger than pressure on the latter stage side by a specified value or higher.

Advantageous Effect of the Invention

According to the present invention, a valve is provided on an ozone treatment apparatus, whereby the pressure of a gas/liquid mixing portion of an ejector can be made to fluctuate largely. As a result, the ozone treatment apparatus can increase the suction amount of gas from the ejector. Furthermore, according to a sludge treatment system according to the present invention, dissolvability of solid components contained in sludge is increased and the generation amount of sludge is reduced.

BRIEF DESCRIPTION OF THE DRAWINGS

FIG. 16 is a view in which the results of Example 1 of the present invention are compared;

FIG. 17 is a view in which the results of Example 2 of the present invention are compared;

MODE FOR CARRYING OUT THE INVENTION

Figure 1:
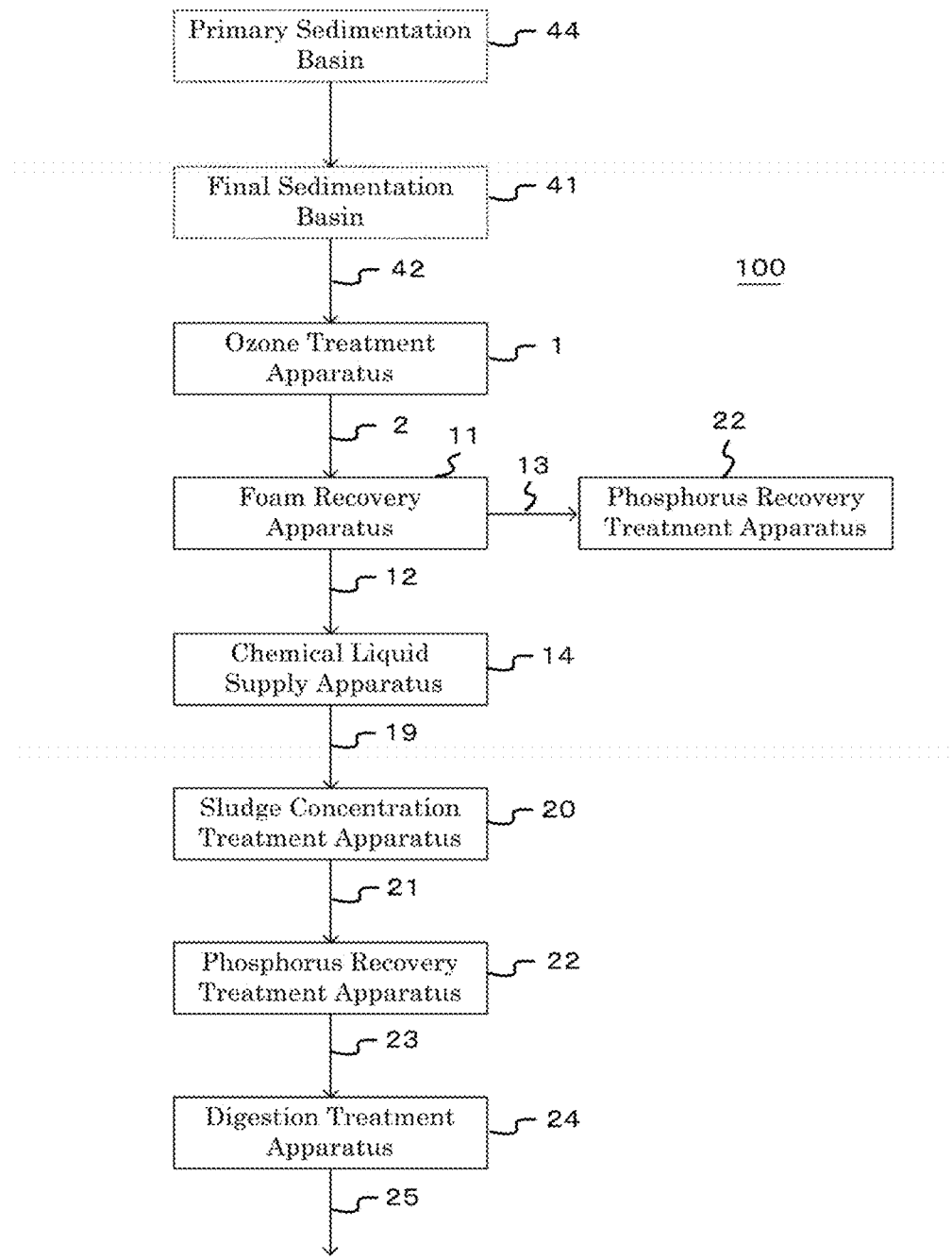
FIG. 1 is a schematic view showing the configuration of a sludge treatment system according to Embodiment 1 of the present invention.

Hereinafter, an ozone treatment apparatus and a sludge treatment system according to embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may different among sectional views in which a part of the configuration is changed. Furthermore, although the configurations of the ozone treatment apparatus and the sludge treatment system are further actually provided with a plurality of members, for ease of explanation, only portions necessary for explanation will be described and other portions are omitted.

Embodiment 1

Hereinafter, an embodiment of an ozone treatment apparatus and a sludge treatment system of the present invention will be described based on drawings. For example, sludge (sewage sludge, industrial wastewater sludge, or the like) is used as water to be treated and ozone gas is used as suction gas. FIG. 1 shows the configuration of a sludge treatment system according to Embodiment 1. A sludge treatment system 100 performs sludge treatment in a process in which excess sludge in a sewage treatment plant is drawn outside the system. In order to perform volume reduction treatment of the excess sludge of a final sedimentation basin 41 of the sewage treatment plant, excess sludge piping 42 is connected to an ozone treatment apparatus 1. A foam recovery apparatus 11 is connected in the latter stage of the ozone treatment apparatus 1 via sludge piping 2. A chemical liquid supply apparatus 14 is connected to foam recovery piping 12 of the foam recovery apparatus 11; and a phosphorus recovery treatment apparatus 22 is arranged in the latter stage of liquid recovery piping 13. A sludge concentration treatment apparatus 20 is connected in the latter stage of the chemical liquid supply apparatus 14 via chemical liquid treatment sludge piping 19; and concentration sludge piping 21 is arranged in the sludge concentration treatment apparatus 20. The concentration sludge piping 21 is connected to a phosphorus recovery treatment apparatus 22; and the phosphorus recovery treatment apparatus 22 is connected to a digestion treatment apparatus 24, which is provided with digested sludge piping 25, via phosphorus removal sludge piping 23.

Figure 2:
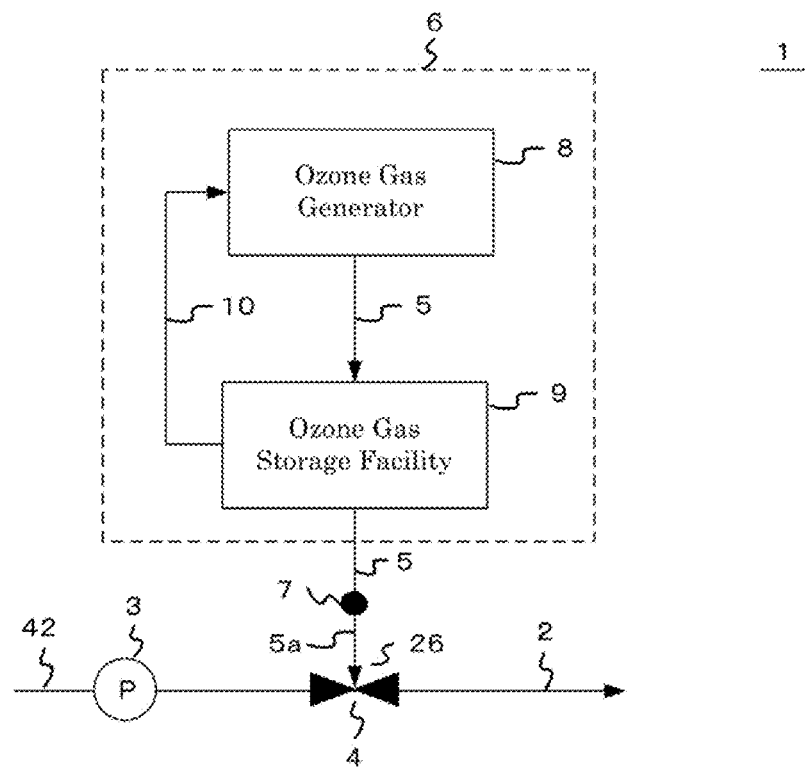
FIG. 2 is a schematic view showing the configuration of an ozone treatment apparatus according to Embodiment 1 of the present invention.

FIG. 2 is a schematic view showing the configuration of the ozone treatment apparatus 1 according to Embodiment 1 of the present invention. A sludge pump 3 is connected to the excess sludge piping 42; and an ejector 4 is arranged in the latter stage of the sludge pump 3. A suction portion 26 of the ejector 4 is connected to an ozone gas supplier 6 via ozone gas piping 5a. A valve 7 is arranged in the ozone gas piping 5a between the suction portion 26 of the ejector 4 and the ozone gas supplier 6. The valve 7 becomes an open state when pressure on the former stage side is larger than pressure on the latter stage side by a specified value or higher. More specifically, the valve 7 is a safety valve that is mechanically opened when the suction portion 26 of the ejector 4 is depressurized to a predetermined pressure or lower. It is desirable that those are all possess a resistance to ozone. The ozone gas supplier 6 includes an ozone gas generator 8 and an ozone gas storage facility 9.

The ozone gas generator 8 generates ozone gas by using oxygen or air as raw material gas. The ozone gas storage facility 9 is arranged in ozone gas piping 5. The ozone gas storage facility 9 is provided with oxygen gas piping 10; and the oxygen gas piping 10 is connected to the ozone gas generator 8. The sludge treatment system 100 according to Embodiment 1 of the present invention may be configured by only the ozone treatment apparatus 1. Furthermore, in the latter stage of the ozone treatment apparatus 1, there may be configured to add one or a plurality of apparatuses, selected from any of the foam recovery apparatus 11, the chemical liquid supply apparatus 14, the sludge concentration treatment apparatus 20, the phosphorus recovery treatment apparatus 22, and the digestion treatment apparatus 24. The foam recovery apparatus 11 separates organic liquid, which is treated with ozone by the ozone treatment apparatus 1, into foam (sludge) and liquid. The organic foam generated by the ozone treatment absorbs sludge. The chemical liquid supply apparatus 14 performs chemical liquid treatment of the organic foam (sludge) treated with ozone by the ozone treatment apparatus 1. The sludge concentration treatment apparatus 20 concentrates the organic foam (sludge) treated with ozone by the ozone treatment apparatus 1. The phosphorus recovery treatment apparatus 22 recovers phosphorus from the organic foam (sludge) or the liquid, which is treated with ozone by the ozone treatment apparatus 1. The digestion treatment apparatus 24 performs digestion treatment of the organic foam (sludge) treated with ozone by the ozone treatment apparatus 1.

Figure 3:
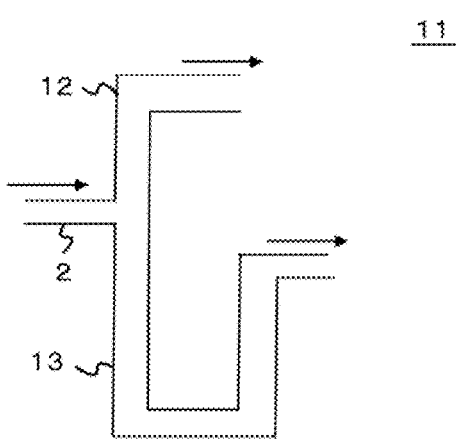
FIG. 3 is a schematic view showing the configuration of a foam recovery apparatus according to embodiments of the present invention.

FIG. 3 is a schematic view showing the configuration of the foam recovery apparatus 11 according to this embodiment of the present invention. The sludge piping 2 is divided up and down. The upward divided sludge piping 2 is connected to the foam recovery piping 12; the downward divided sludge piping 2, to the liquid recovery piping 13, respectively. The sludge is foamed by injecting the ozone gas by the ejector 4 and the foamed sludge passes through the foam recovery piping 12. The liquid recovery piping 13 is folded from downward to upward to provide a structure in which liquid is accumulated.

Figure 4:
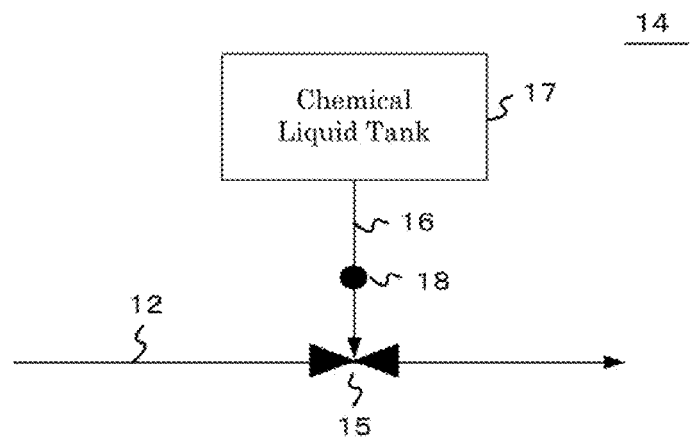
FIG. 4 is a schematic view showing the configuration of a chemical liquid supply apparatus according to Embodiment 1 of the present invention.

FIG. 4 is a schematic view showing the configuration of the chemical liquid supply apparatus 14 according to Embodiment 1 of the present invention. A chemical liquid ejector 15 is arranged in the foam recovery piping 12. A chemical liquid suction portion of the chemical liquid ejector 15 is connected to a chemical liquid tank 17 via chemical liquid piping 16. A chemical liquid valve 18 is arranged in the chemical liquid piping 16 between the chemical liquid suction portion of the chemical liquid ejector 15 and the chemical liquid tank 17. The chemical liquid valve 18 is a safety valve that is opened when the pressure of the chemical liquid suction portion of the chemical liquid ejector 15 is depressurized to a predetermined pressure or lower.

If concentration treatment, phosphorus recovery treatment, and digestion treatment are performed to the foam (sludge) recovered from the foam recovery piping 12 in the latter stage of the ozone treatment apparatus, a phosphorus recovery rate and the generation amount of digestion gas increase and the generation amount of sludge can be reduced. Further, scales can be suppressed from being attached to digestion treatment piping and maintenance and management costs can be suppressed. Furthermore, if the concentration treatment and the digestion treatment are performed to the sludge recovered from the foam recovery piping 12, the generation amount of digestion gas increases and the generation amount of sludge can be reduced. Moreover, the sludge recovered from the foam recovery piping 12 is concentrated; and therefore, if the digestion treatment is performed without performing the concentration treatment, a high recovery rate of digestion gas with a small amount of energy consumption can be achieved and the generation amount of sludge can be reduced. The concentration treatment, the phosphorus recovery treatment, and the digestion treatment may be performed without separating the foam and the liquid in the latter stage of the ozone treatment apparatus.

Figure 5:
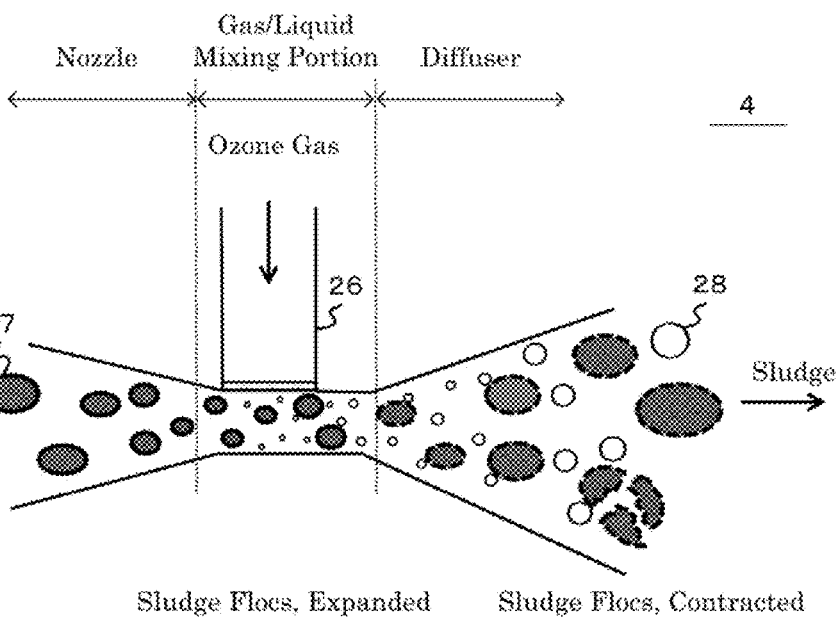
FIG. 5 is a schematic view showing a pull-in of ozone gas into sludge flocs according to Embodiment 1 of the present invention.

FIG. 5 exemplarily represents the structure of the ejector 4. The ejector 4 is divided into a nozzle, a gas/liquid mixing portion, and a diffuser; and the suction portion 26 is provided on the gas/liquid mixing portion. The sludge treatment is started by introducing the sludge pressurized by the sludge pump 3 to the sludge piping 2. If the sludge pressurized by the sludge pump 3 is introduced to the ejector 4 at a constant flow velocity, the pressure of the gas/liquid mixing portion of the ejector 4 becomes lower than atmospheric pressure in a state where the suction portion 26 of the ejector 4 is constantly opened. Therefore, the ozone gas is sucked from the suction portion 26 of the ejector 4 to the gas/liquid mixing portion and the ozone gas is mixed with the sludge. The ozone gas is pulled in the sludge at the gas/liquid mixing portion; and thus, the ozone gas is reacted with the sludge to foam. At this time, in the diffuser, the ozone gas and moisture around the sludge flocs 27 are pulled into the inside of the sludge flocs 27.

The sludge treatment system according to this embodiment is characterized in that power is not needed to open/close means that opens/closes the suction portion of the gas/liquid mixing portion by providing the safety valve which is opened at the predetermined pressure as the means that opens/closes the suction portion. Furthermore, the sludge treatment system according to this embodiment is characterized in that the organic liquid containing solid material serves as the water to be treated and the ozone gas serves as treatment gas. Moreover, a sludge treatment method according to this embodiment is characterized in that, in a method of performing gas/liquid mixing by pressurizing the water to be treated, a first process that sucks gas and a second process that does not suck gas are provided and the first process and the second process are switched. In addition, the sludge treatment method is characterized in that switching between the first process and the second process is repeated. Further, the sludge treatment method that switches the first process and the second process is characterized in that a first process time is equivalent to or more than a second process time.

Figure 6:
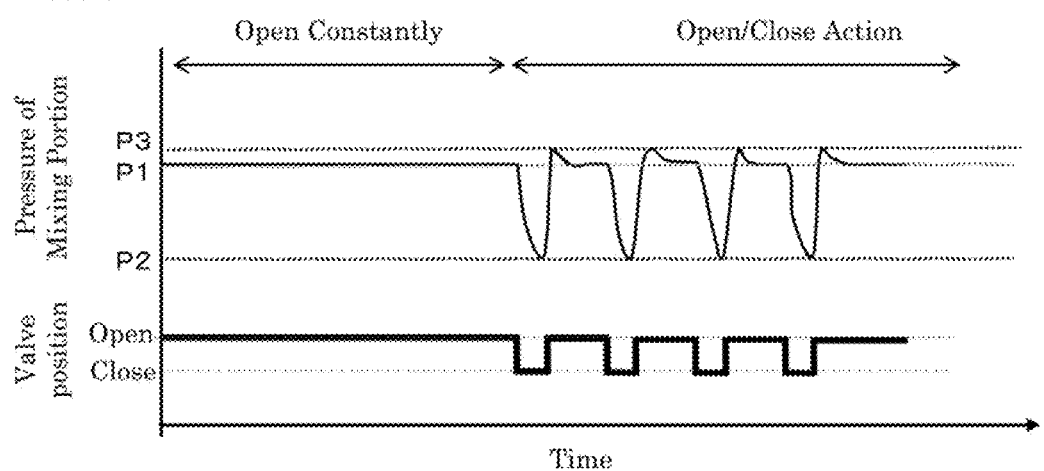
FIG. 6 is a schematic view of pressure fluctuation of a gas/liquid mixing portion according to Embodiment 1 of the present invention.

Next, the operation of the sludge treatment system according to this embodiment of the present invention will be described. FIG. 6 is a schematic view that represents pressure fluctuation in the gas/liquid mixing portion of the ejector 4. Here, the ozone treatment of the sludge is performed by switching opening/closing of the valve 7. The pressure of the gas/liquid mixing portion of the ejector 4 is a pressure P1 that is lower than the atmospheric pressure in the state where the suction portion 26 of the ejector 4 is constantly opened. If the valve 7 is closed, the ozone gas remained in the suction portion 26 of the ejector 4 and the ozone gas piping 5a of the valve 7 is exhausted; and thus, the pressure of the gas/liquid mixing portion of the ejector 4 is lowered to a pressure P2 that is lower than that of the state where the suction portion 26 of the ejector 4 is constantly opened. Subsequently, if the valve 7 is opened, the ozone gas is sucked from the suction portion 26 of the ejector 4 to the sludge; and therefore, the pressure of the gas/liquid mixing portion of the ejector 4 is increased.

At this time, the pressure of the gas/liquid mixing portion of the ejector 4 is once increased to a pressure P3 that is higher than the pressure in the state where the suction portion 26 is constantly opened. After that, the pressure of the gas/liquid mixing portion of the ejector 4 is lowered to the pressure P1 in the state where the suction portion 26 of the ejector 4 is constantly opened. The pressure of the gas/liquid mixing portion has the relationship of $0<P2<P1 \leq P3<$(nozzle pressure-diffuser pressure). A pressure fluctuation $\Delta P$ (P1−P2) of the gas/liquid mixing portion is more increased when the valve 7 is opened/closed as in this embodiment, as compared to the state where the suction portion 26 of the ejector 4 is constantly opened. As a result, the suction amount of ozone gas from the suction portion 26 is increased and the suction amount of ozone gas at the time when the valve 7 is opened is increased.

The pressure fluctuation ΔP is increased; and therefore, an impact by the pressure fluctuation makes the sludge flocs 27 more disperse. Further, the pressure of the gas/liquid mixing portion of the ejector 4 is lowered (P1→P2) by closing the valve 7 as compared to the state where the suction portion 26 of the ejector 4 is constantly opened; and therefore, the sludge flocs 27 are more expanded. When the sludge flocs 27 are expanded, the moisture and gas components in the inside of the sludge flocs 27 are pulled out from the sludge flocs 27. The sludge flocs 27 expanded when the valve 7 is opened are contracted while pulling more moisture and gas component into the inside of the sludge flocs 27. At this time, the ozone gas comes in contact with the inside of the sludge flocs 27; and thus, the solid components of the sludge are dissolved and dispersibility is improved.

The pressure of the gas/liquid mixing portion is lowered by further closing the valve 7; and therefore, the amount of ozone gas, which is sucked when the valve 7 is opened, is increased. The injection amount of ozone gas into the sludge is increased; and therefore, the reaction of the ozone gas with the sludge can be accelerated. As described above, if the pressure fluctuation of the gas/liquid mixing portion of the ejector 4 is increased, the sludge flocs 27 are micronized by physical action; and thus, the sludge flocs 27 are oxidized by the ozone gas and the dissolution of the solid components of the sludge is accelerated. Furthermore, more ozone gas is pulled into the inside of the sludge flocs 27; and thus, oxidization is made by the ozone gas into the inside of the sludge flocs 27 and dissolution of the solid components of the sludge is further accelerated.

If the sludge is solubilized, foam generated by reacting the ozone with the sludge is micronized, the efficiency of contact of the foam with the sludge is improved, and the efficiency of the reaction of the foam with the sludge is further improved. Furthermore, if opening/closing of the valve 7 is repeated, expansion and contraction of the water to be treated are repeated correspondingly; and therefore, pulsation is generated in the water to be treated in the latter stage of the ejector 4. This has an effect that the sludge and the scales are suppressed from being attached to the inside of the sludge piping 2. A cleaning effect of the piping by bubbles 28 and the pulsation can be obtained by opening/closing the valve 7 of the suction portion 26 of the ejector 4 and maintenance and management costs of the sludge piping 2 can be reduced.

In the case of placing the valve 7 in the ozone gas piping 5a, it is desirable that the length of the ozone gas piping 5a between the suction portion 26 of the ejector 4 and the valve 7 is prolonged. Furthermore, the inner volume of the ozone gas piping 5a between the suction portion 26 and the valve 7 may be increased by increasing the diameter of the ozone gas piping 5a between the suction portion 26 of the ejector 4 and the valve 7. Alternatively, the inner volume of the ozone gas piping 5a between the suction portion 26 and the valve 7 may be increased by installing a tank in the ozone gas piping 5a between the suction portion 26 of the ejector 4 and the valve 7. The inside of the ozone gas piping 5a between the suction portion 26 of the ejector 4 and the valve 7 is depressurized during a period when the valve 7 is closed. If the valve 7 is opened, the amount of gas corresponding to the inner volume of the ozone gas piping 5a between the suction portion 26 of the ejector 4 and the valve 7 is sucked into the sludge. Therefore, the ozone gas piping 5a between the suction portion 26 of the ejector 4 and the valve 7 is prolonged; and thus, the amount of ozone gas, which is sucked into the sludge when the valve 7 is opened, is increased and the pulsation of the water to be treated in the latter stage of the ejector 4 can be increased.

As for the optimum intermittent cycle of the valve 7, it is desirable that the length of the time when gas is not sucked by closing the valve 7 is set to the length of the time when the pressure of the gas/liquid mixing portion reaches the pressure P2. If the time when the valve 7 is closed is increased, the ratio of the time when the ozone gas per unit time is not sucked is increased. As a result, the average amount of suction per unit time of the ozone gas is decreased. Therefore, it is better that the time when the valve 7 is closed is equivalent to or shorter than the time when the valve 7 is opened. Furthermore, if the period when the valve 7 is closed is short, the pressure of the gas/liquid mixing portion cannot reach P2; and therefore, the suction amount of ozone gas from the suction portion 26 is decreased. The cycle of the optimum intermittent suction is defined by the relationship between the inner volume from the suction portion 26 to the valve 7 and the time. Incidentally, during the period when the valve 7 is closed, the ozone gas in the ozone gas piping 5a between the valve 7 and the suction portion 26 is exhausted and shearing force with respect to the amount of suction gas in the gas/liquid mixing portion is increased to generate minute bubbles. The minute bubbles can come in contact with a minute portion of the sludge flocs 27; and therefore, solubilization of the sludge is accelerated.

When the ozone gas piping 5a between the ejector 4 and the valve 7 is sufficiently long, the operation of opening the valve 7 may be started before the pressure of the gas/liquid mixing portion reaches the pressure P2. This is because that the ozone gas piping 5a between the ejector 4 and the valve 7 is sufficiently long; and therefore, even when the pressure of the gas/liquid mixing portion does not reach P2, the amount of ozone gas needed when the valve 7 is opened can be sucked into the sludge. Furthermore, it is desirable that the length of the time when gas is sucked by opening the valve 7 is set to the length of the time when the pressure of the gas/liquid mixing portion reaches the pressure P1 via the pressure P3. This sucks the sufficient amount of ozone gas when the valve 7 is opened; and therefore, the pressure fluctuation of the suction portion 26 of the ejector 4 can be increased, dissolution of the sludge is accelerated, and the pulsation of the water to be treated in the sludge piping 2 in the latter stage of the ejector 4 is increased.

In the ozone treatment of the sludge treatment method according to Embodiment 1 of the present invention, preferably, an injection ratio of ozone to be sucked into the sludge by the ejector 4 is 0.01 to 1 g-O3/g-SS; more particularly, preferably, 0.03 to 0.07 g-O3/g-SS. In the case where the ozone injection ratio is equal to or less than 0.01 g-O3/g-SS, the solid components of the sludge cannot be sufficiently solubilized. When the ozone gas is intermittently injected into the sludge by opening/closing of the valve 7, a predetermined ozone injection ratio can be achieved at a small flow rate of ozone gas if a high concentration ozone gas of 5 to 100 vol % is used. In the case of the small flow rate of ozone gas, the shearing force with respect to the amount of suction gas in the gas/liquid mixing portion is increased and the diameter of the bubble of the ozone gas at a time when the ozone gas is mixed with the sludge by the ejector 4 can be decreased.

The higher an ozone gas concentration, the larger the velocity of dissolution of the ozone gas into the sludge; the smaller the bubble diameter, the larger a specific surface area per unit volume; and therefore, gas dissolution efficiency is increased. Small bubbles 28 can come in contact with the minute portion of the sludge flocs 27; and the ozone gas around the sludge flocs 27 can be pulled into the inside of the sludge flocs 27 when the sludge is expanded. Furthermore, the higher the ozone gas concentration, which is dissolved from the bubbles to the sludge, the larger the velocity of reaction with the sludge; and therefore, the solid components of the sludge can be effectively solubilized by using ozone gas with a high concentration.

In the ozone treatment according to Embodiment 1 of the present invention, the sludge is dissolved by the ozone treatment and the foam foamed by reacting the ozone with the sludge is micronized. The efficiency of contact between the micronized foam and the sludge is improved; and therefore, the efficiency of the reaction of the foam with the sludge is improved. The sludge is solubilized by the ozone to improve dispersibility of the sludge and the sludge is reformed so as to be easily biodegradable. Therefore, if the digestion treatment is performed in the latter stage of the ozone treatment, digestion of the sludge is accelerated to increase the generation amount of digestion gas and the generation amount of sludge is reduced. Furthermore, the sludge is solubilized by the ozone treatment and therefore the recovery amount of phosphorus is increased.

In the foam recovery treatment according to Embodiment 1 of the present invention, the sludge foamed by reacting the ozone gas with the sludge is separated into the foam and the liquid. As for the sludge foamed by reacting the ozone gas with the sludge, the foam is pushed out from the foam recovery piping 12 and the liquid is recovered from the liquid recovery piping 13 in the foam recovery apparatus 11. This is because that the liquid recovery piping 13 has a structure in which liquid can be accumulated; and the foam can be prevented from flowing out from the liquid recovery piping 13 and the foam and the liquid can be separated.

The solid components of the sludge are attached to the surface of the foam pushed out from the foam recovery piping 12 and the solid components of the sludge are separated from the liquid by flotation separation. The sludge recovered from the foam recovery piping 12 is concentrated; and therefore, in the latter stage, the chemical liquid treatment, the sludge concentration treatment, the phosphorus recovery treatment, and the digestion treatment can be effectively performed to the recovered sludge. Furthermore, the solid components of the sludge and the liquid are separated; and therefore, a load of the sludge concentration treatment in the latter stage can be suppressed.

In the chemical liquid treatment according to Embodiment 1 of the present invention, organic matter in the sludge is made to dissolve by chemical liquid to solubilize the sludge. The ozone-treated sludge is introduced to the chemical liquid ejector 15 and is mixed with alkaline chemical liquid stored in the chemical liquid tank 17. The chemical liquid supply apparatus operates by the same principle as the ozone treatment apparatus of Embodiment 1 of the present invention and alkali is added so that pH of the sludge becomes 9 to 13. In the case of subsequently performing the treatment in the latter stage of the chemical liquid treatment, pH adjustment of the treated water after the chemical liquid treatment may be performed according to the treatment in the latter stage.

The chemical liquid supply apparatus has the same configuration as that of the ozone treatment apparatus 1; and thus, pressure fluctuation of a liquid/liquid mixing portion of the chemical liquid ejector 15 can be increased by opening/closing the chemical liquid valve 18. Therefore, pulsation is generated in the latter stage of the chemical liquid ejector 15 and the organic matter and the scales can be suppressed from being attached to the piping. Furthermore, the sludge is dispersed by physical action and more chemical liquid is pulled into the inside of the sludge flocs 27; and thus, dissolution of the sludge is accelerated. The chemical liquid treatment is performed in the latter stage of the ozone treatment apparatus; and thus, the generation amount of the sludge can be further reduced. Moreover, if the digestion treatment or the phosphorus recovery treatment is performed in the latter stage, the generation amount of digestion gas or the recovery amount of phosphorus can be increased.

In the sludge treatment method according to this embodiment of the present invention, only the ozone treatment may be performed; alternatively, any one of or combination of a plurality of the chemical liquid treatment, the foam recovery treatment, the concentration treatment, the phosphorus recovery treatment, and the digestion treatment may be performed in the latter stage of the ozone treatment. The sludge treatment system according to this embodiment of the present invention can be installed, for example, in a process of returning the excess sludge of the final sedimentation basin of the sewage treatment plant to an activated sludge tank and in a process of concentrating the excess sludge; or the sludge treatment system can be installed in a process of internally circulating excess sludge in an activated sludge tank of a membrane separation activated sludge method and in a process of drawing the excess sludge to the outside of the system.

Embodiment 2

Figure 7:
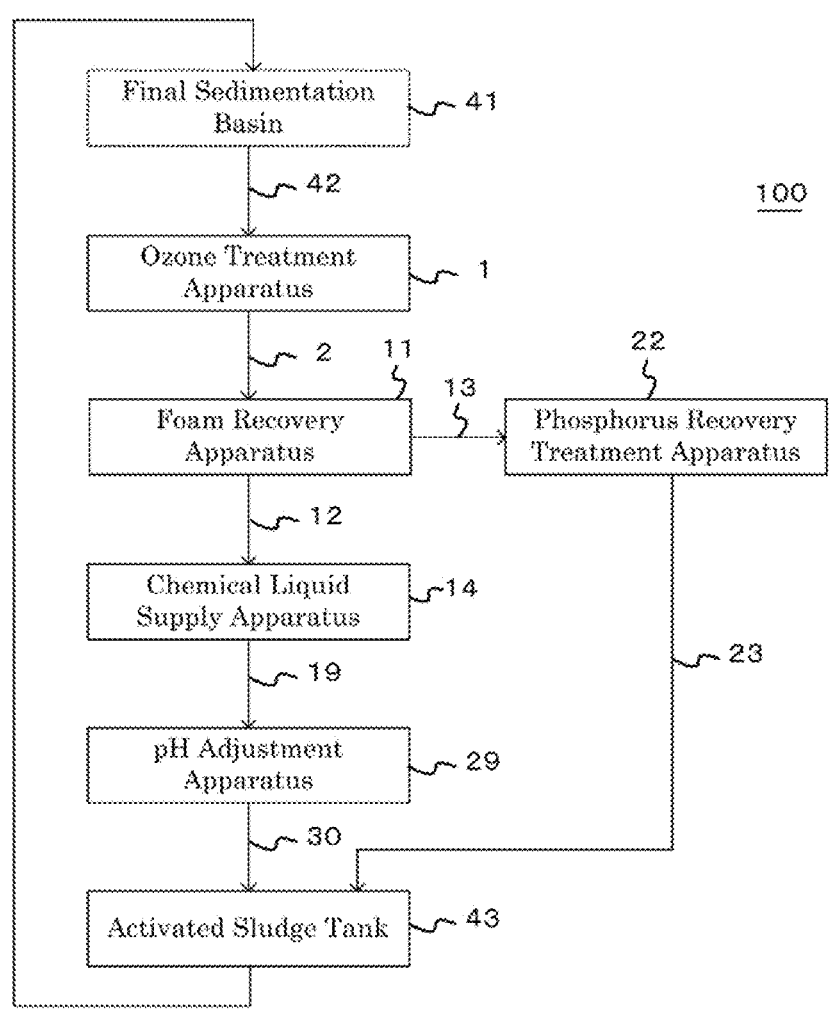
FIG. 7 is a schematic view showing the configuration of a sludge treatment system according to Embodiment 2 of the present invention.

FIG. 7 shows the configuration of a sludge treatment system according to Embodiment 2 of the present invention. A sludge treatment system 100 according to this embodiment performs sludge treatment in a returning process of excess sludge. For example, sludge is used as water to be treated and ozone gas is used as suction gas. Excess sludge piping 42, which is for returning excess sludge of a final sedimentation basin 41 to an activated sludge tank 43, is connected to an ozone treatment apparatus 1. Sludge piping 2 is connected to a foam recovery apparatus 11; and a chemical liquid supply apparatus 14 is connected to foam recovery piping 12. A phosphorus recovery treatment apparatus 22 is installed in liquid recovery piping 13. A pH adjustment apparatus 29 is arranged on the chemical liquid supply apparatus 14 via chemical liquid treatment sludge piping 19.

The pH adjustment apparatus 29 is connected to pH adjustment sludge piping 30 and is connected to the activated sludge tank 43 or to piping communicated to the activated sludge tank via the pH adjustment sludge piping 30. The phosphorus recovery treatment apparatus 22 is connected to the activated sludge tank 43 or to piping communicated to the activated sludge tank via phosphorus removal sludge piping 23. In the case where the sludge treatment is performed in the returning process of the excess sludge, the sludge treatment system 100 may be configured by only the ozone treatment apparatus 1. It may be configured such that either one of or both of the foam recovery apparatus 11 and the chemical liquid supply apparatus 14 provided with the pH adjustment apparatus 29 are provided in the latter stage of the an ozone treatment apparatus 1. Furthermore, the liquid recovery piping 13 may be configured to be connected to the final sedimentation basin 41 or the activated sludge tank 43.

Figure 8:
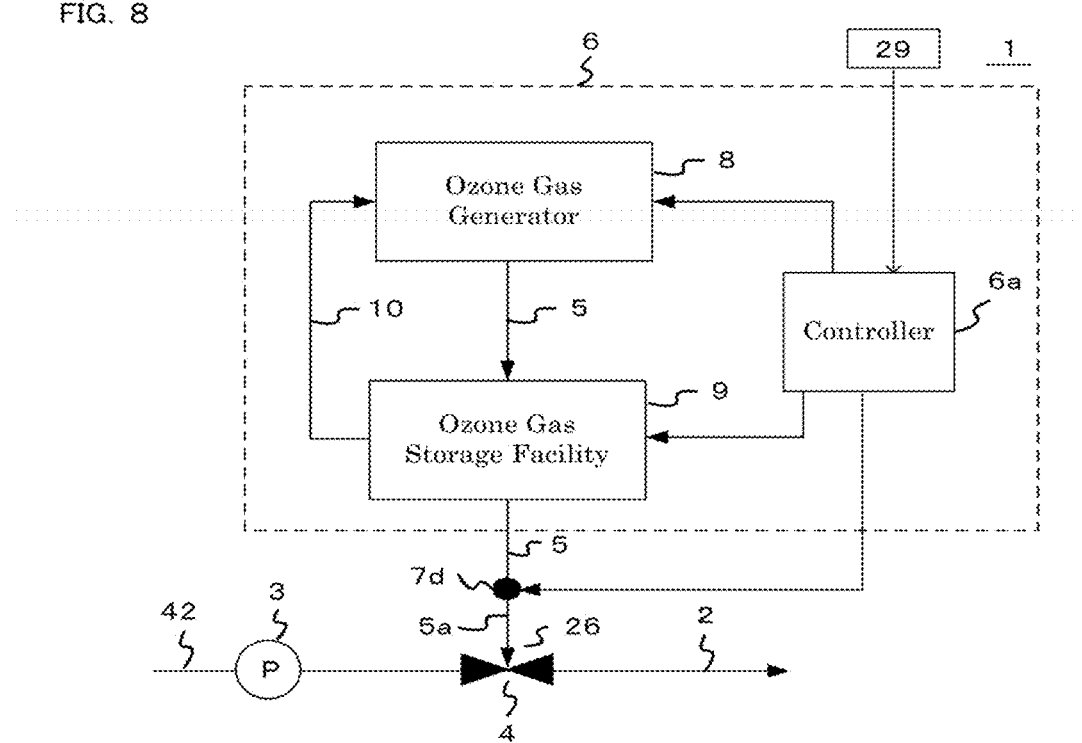
FIG. 8 is a schematic view showing the configuration of an ozone treatment apparatus according to Embodiment 2 of the present invention.
Figure 9:
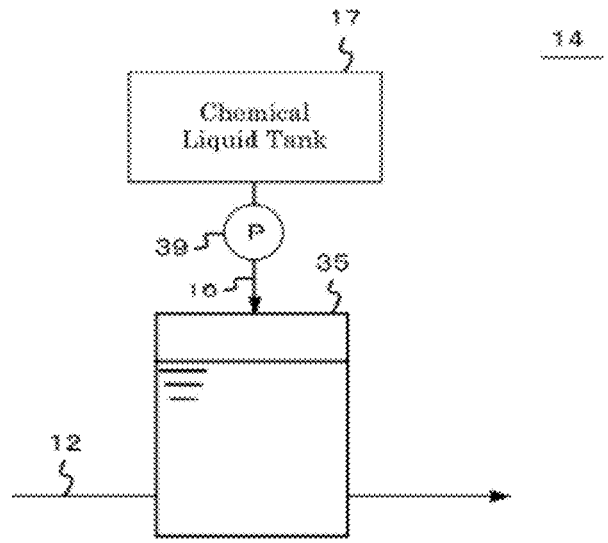
FIG. 9 is a schematic view showing the configuration of a chemical liquid supply apparatus according to Embodiment 2 of the present invention.

FIG. 8 is a schematic view showing the configuration of the ozone treatment apparatus 1 according to Embodiment 2 of the present invention. A controller 6a monitors an ozone gas generator 8, an ozone gas storage facility 9, and a solenoid valve 7d. The controller 6a of the ozone treatment apparatus 1 operates the solenoid valve 7d to switch suction and stop of the ozone gas every predetermined time. FIG. 9 is a schematic view showing the configuration of the chemical liquid supply apparatus 14 according to this embodiment. A sludge dissolution tank 35 is arranged in the sludge piping 2 and is connected to a chemical liquid tank 17 via chemical liquid piping 16. A chemical liquid injection pump 39 is arranged between the sludge dissolution tank 35 and the chemical liquid tank 17.

If ozone-treated sludge is returned to the activated sludge tank 43 (or a primary sedimentation basin 44), the sludge is reformed by the ozone treatment; and therefore, the sludge is decomposed and removed by the function of microorganisms of the activated sludge tank 43 and the generation amount of the excess sludge can be reduced. Furthermore, ozone-treated water is separated into foam and liquid by the foam recovery apparatus 11; and if the chemical liquid treatment is performed to the sludge that is attached to the surface of the foam and is concentrated, the sludge can be effectively solubilized and the generation amount of sludge can be further reduced. Treated water to which chemical liquid is injected after the ozone treatment is returned to the primary sedimentation basin or the activated sludge tank 43 after performing pH adjustment of the treated water; and thus, an influence on the treatment performed in the returned tank can be prevented. Incidentally, it is desirable that pH of the treated water is adjusted to be in the range of +1.5 to −1.5 of the water to be treated which is accumulated in the tank of the return destination.

Embodiment 3

Figure 10:
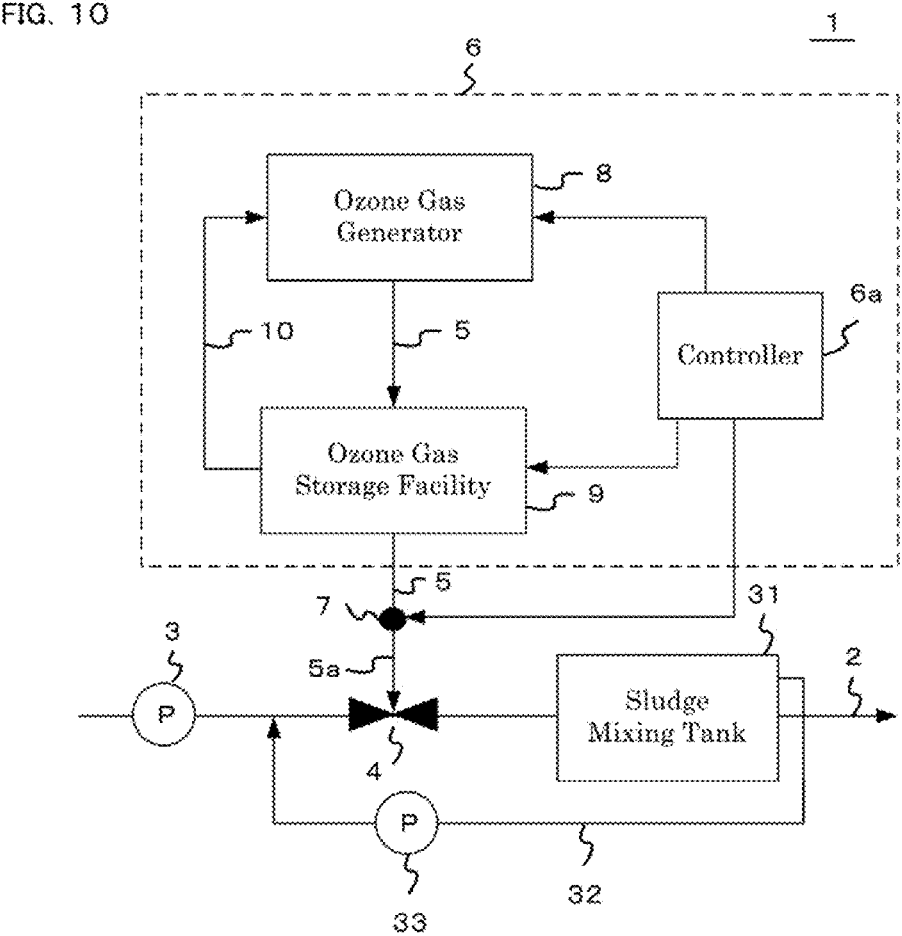
FIG. 10 is a schematic view showing the configuration of an ozone treatment apparatus according to Embodiment 3 of the present invention.

FIG. 10 is a schematic view showing the configuration of an ozone treatment apparatus 1 according to Embodiment 3 of the present invention. This embodiment is characterized in that a sludge mixing tank 31 is arranged in the latter stage of the ozone treatment apparatus 1 of Embodiment 1 and sludge circulation piping 32 and a sludge circulation pump 33 are added. The sludge mixing tank 31 is arranged in sludge piping 2 placed in the latter stage of an ejector 4. The sludge mixing tank 31 is provided with the sludge circulation piping 32 which is connected to the sludge piping 2 placed in the former stage of the ejector 4. The sludge circulation pump 33 is arranged in the sludge circulation piping 32. The sludge mixing tank 31 may have the function of the foam recovery apparatus 11 by arranging the connection position of the sludge circulation piping 32 and the sludge mixing tank 31 at the upper side of the sludge mixing tank 31.

Figure 11:
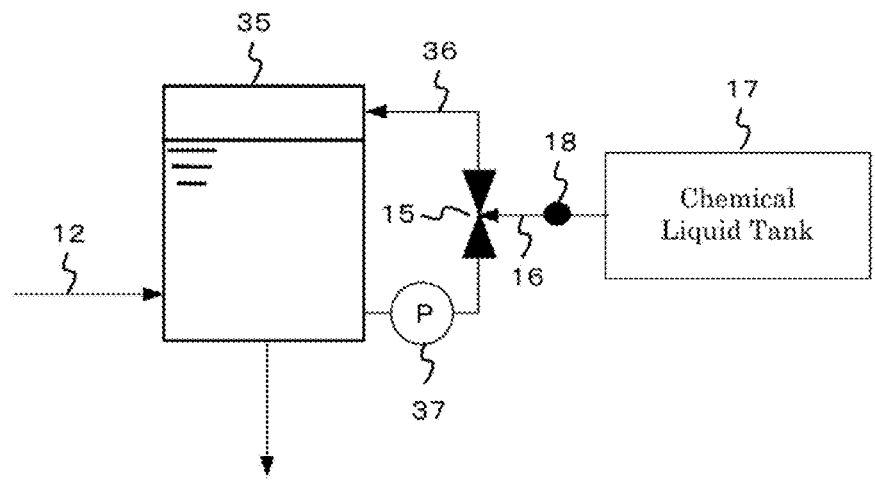
FIG. 11 is a schematic view showing the configuration of a chemical liquid supply apparatus according to Embodiment 3 of the present invention.

FIG. 11 is a schematic view showing the configuration of a chemical liquid supply apparatus 14 according to this embodiment. A sludge dissolution tank 35 is arranged in foam recovery piping 12 (or sludge piping 2) and the sludge dissolution tank 35 is provided with dissolved sludge circulation piping 36. An outflow port to the dissolved sludge circulation piping 36 is arranged at a position lower than the liquid surface of the sludge dissolution tank 35. A dissolved sludge circulation pump 37 is arranged in the dissolved sludge circulation piping 36 and the chemical liquid ejector 15 having the configuration of Embodiment 1 is arranged in the latter stage of the dissolved sludge circulation pump 37. Further, the sludge dissolution tank 35 is installed in the chemical liquid supply apparatus 14; and thus, the time when chemical liquid comes in contact with sludge can be secured and solubilization of the sludge by the chemical liquid is accelerated. Furthermore, there is an effect in that the sludge and scales are suppressed from being attached by pulsation in the dissolved sludge circulation piping 36 placed in the latter stage of the chemical liquid ejector 15.

Characteristic operation by the sludge treatment system according to this embodiment of the present invention will be described. The sludge brought into contact with ozone gas is mixed in the sludge mixing tank 31. A part of the sludge of the sludge mixing tank 31 is flown out to the treatment of the latter stage via the sludge piping 2 and a part of the sludge is circulated in the former stage of the ejector 4 by the sludge circulation pump 33 via the sludge circulation piping 32. At this time, the flow velocity of the sludge circulation pump 33 is set to be larger than the flow velocity of the sludge pump 3. For example, the flow velocity of the sludge circulation pump 33 is set as 2 to 3 times of the flow velocity of the sludge pump 3. Thus, the sludge can be repeatedly circulated in the ejector 4, an ozone injection ratio into the sludge is increased and dissolution of the sludge can be further accelerated. Furthermore, the sludge mixing tank 31 is made to have the function of the foam recovery apparatus 11; and thus, a high dissolution rate of the sludge by the ozone can be obtained.

Embodiment 4

Figure 12:
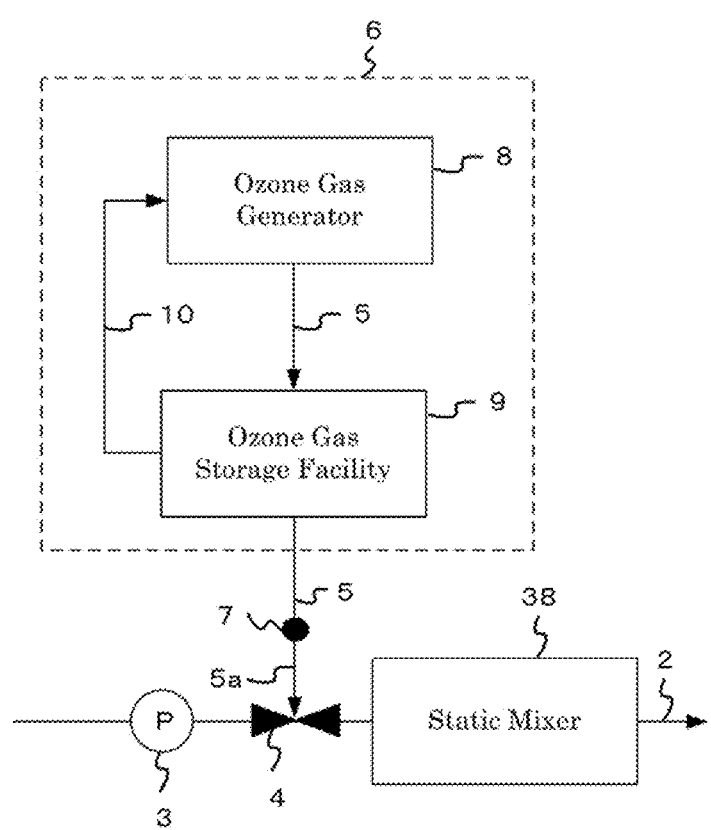
FIG. 12 is a schematic view showing the configuration of an ozone treatment apparatus according to Embodiment 4 of the present invention.

FIG. 12 is a schematic view showing the configuration of an ozone treatment apparatus 1 according to Embodiment 4 of the present invention. For example, sludge is used as water to be treated and ozone gas is used as suction gas. This embodiment is characterized in that a static mixer 38 having a function that accelerates performing gas/liquid mixing is arranged in the latter stage of the ozone treatment apparatus 1 of Embodiment 1. The static mixer 38 is connected to the latter stage of an ejector 4 via sludge piping 2. Fluid entered in the static mixer is sequentially stirred and mixed by an element. Characteristic operation by the sludge treatment system of this embodiment will be described. The sludge is stirred in the sludge piping 2 by the static mixer 38 placed in the latter stage of the ejector 4; and therefore, the efficiency of contact with ozone gas can be increased in a space-saving manner and dissolution of the sludge can be accelerated. Furthermore, a sludge dissolution tank 35 is arranged in the latter stage of the ozone treatment apparatus 1 and chemical liquid is injected into the sludge; and thus, the sludge can be further solubilized.

Embodiment 5

Figure 13:
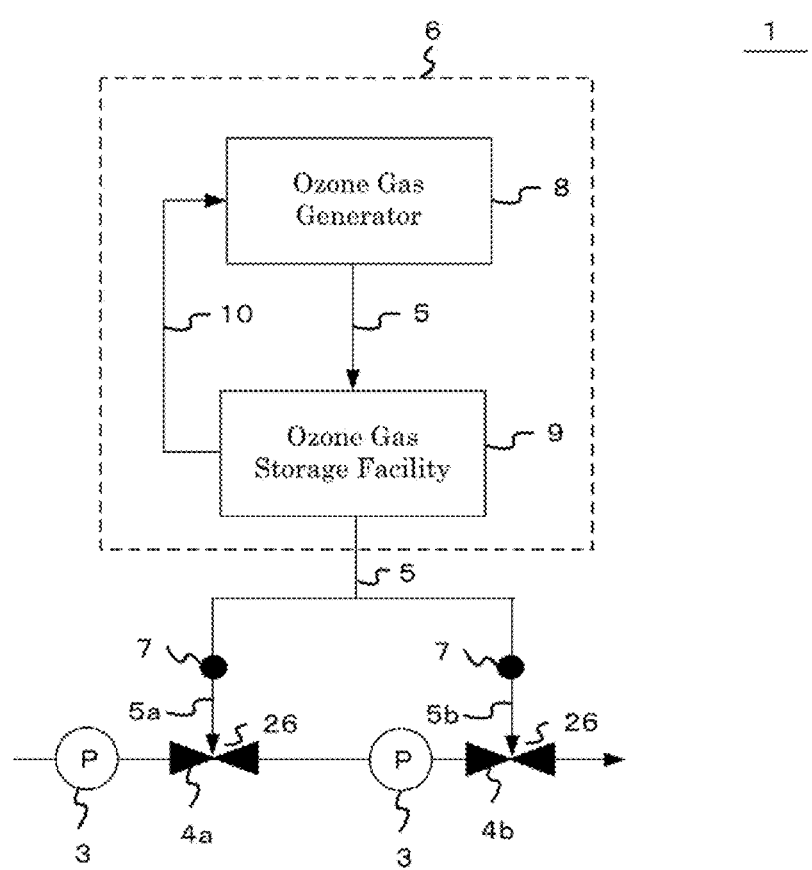
FIG. 13 is a schematic view showing the configuration of an ozone treatment apparatus according to Embodiment 5 of the present invention.

FIG. 13 is a schematic view showing the configuration of a sludge treatment system according to Embodiment 5 of the present invention. For example, sludge is used as water to be treated and ozone gas is used as suction gas. This embodiment is characterized in that the ejectors 4 of Embodiment 1 are continuously arranged. An ejector 4b is arranged in sludge piping 2 placed in the latter stage of an ejector 4a. A suction portion 26 of the ejector 4b is connected to an ozone gas supplier 6 via ozone gas piping 5b. A valve 7 is arranged in the ozone gas piping 5b between the suction portion 26 of the ejector 4b and the ozone gas supplier 6. The ejector 4b with a higher driving flow velocity than that of the ejector 4a is selected. Alternatively, a sludge pump 3 may be placed between the ejector 4a and the ejector 4b.

Characteristic operation by the sludge treatment system of this embodiment will be described. The sludge is brought into contact with ozone gas by the ejector 4a and is dissolved. The ozone gas is further injected into the dissolved sludge by the ejector 4b; and thus, solubilization of the sludge can be accelerated. The ejectors 4 are configured to be continuously arranged; and thus, the time when the ozone comes in contact with the sludge is secured and decomposition of solid components of the sludge can be accelerated. As a result, the generation amount of sludge can be reduced and a phosphorus recovery rate and the generation amount of digestion gas are increased.

Embodiment 6

Figure 14:
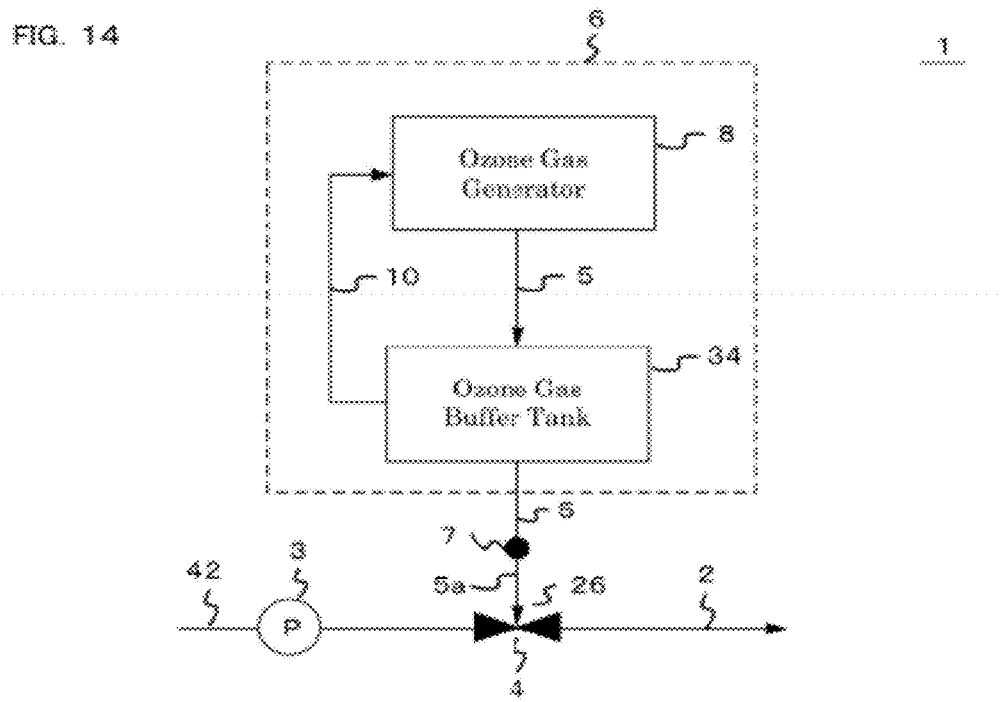
FIG. 14 is a schematic view showing the configuration of an ozone treatment apparatus according to Embodiment 6 of the present invention.

The configuration of a sludge treatment system according to Embodiment 6 of the present invention will be described based on drawings. FIG. 14 is a schematic view showing the configuration of an ozone treatment apparatus 1 according to this embodiment of the present invention. An ozone gas supplier 6 includes an ozone gas generator 8 and an ozone gas buffer tank 34. The ozone gas generator 8 and the ozone gas buffer tank 34 are connected by ozone gas piping 5. Alternatively, the configuration may be made by only the ozone gas generator 8.

Figure 15:
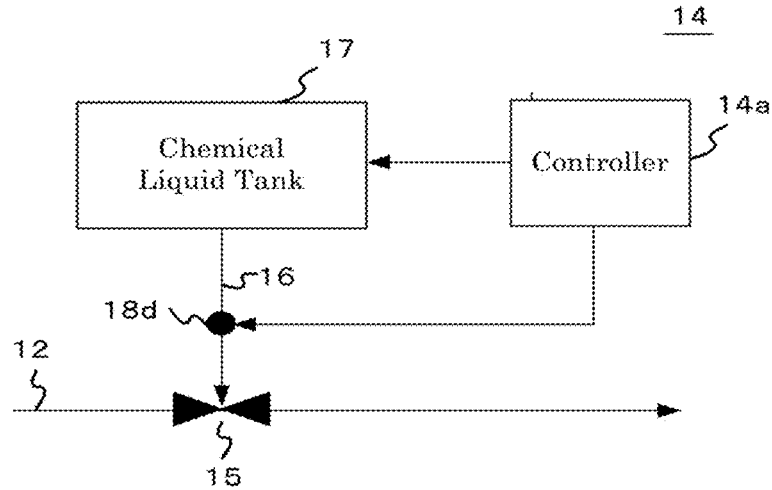
FIG. 15 is a schematic view showing the configuration of a chemical liquid supply apparatus according to Embodiment 6 of the present invention.

FIG. 15 is a schematic view showing the configuration of a chemical liquid supply apparatus according to Embodiment 6 of the present invention. A chemical liquid supply apparatus 14 according to Embodiment 6 includes a controller 14a that controls opening/closing of a chemical liquid solenoid valve 18d. A sludge dissolution tank 35 is arranged in sludge piping 2 and is connected to a chemical liquid tank 17 via chemical liquid piping 16. A chemical liquid injection pump 39 is arranged between the sludge dissolution tank 35 and the chemical liquid tank 17. The controller 14a operates the chemical liquid solenoid valve 18d to switch suction and stop of chemical liquid every predetermined time or to open when pH of treated water reaches a predetermined value.

Example 1

Hereinafter, effects of the present invention will be described by enumerating examples. The configuration of the ozone treatment apparatus according to Embodiment 1 is used, pure water is used as water to be treated, and air is used as gas. The pure water is made to flow in the ejector at a constant flow velocity of a flow rate of 5 L/min; and intermittent suction from the suction portion of the ejector is performed by switching opening/closing of the valve. At this time, the average amount of gas per one cycle sucked from the suction portion of the ejector is measured. Furthermore, the average amount of gas, which is sucked from the suction portion of the ejector in a state where the valve is constantly opened, is measured for comparison; and the results thereof is shown in FIG. 16.

As shown in the following equation, the average amount of suction per one cycle is one in which, when opening/closing of the valve is repeated at a certain interval, the amount of gas which is sucked at the time when the valve is opened one time is divided by the sum of the time when the valve is opened one time and the time when the valve is closed one time. The maximum amount of instantaneous suction at the time of opening represents the maximum amount of gas instantaneously sucked when the valve is opened when opening/closing of the valve is repeated at a certain interval.

The average amount of suction per one cycle (L/min)=the amount of suction gas at the time when the valve is opened one time (L)/[the time when the valve is opened one time (min)+the time when the valve is closed one time (min)]

From the results of FIG. 16, an effect is recognized in that, if the valve of the suction portion of the ejector is opened/closed, the average amount of suction is more increased and the amount of suction gas is more increased as compared to the comparative example. In the case where the time when the valve is opened is equivalent, the average amount of suction is more increased when the time, at which the valve is closed, is shorter. This is because that the longer the time when the valve is closed, the longer the time when gas per unit time is not sucked and the smaller the average amount of suction. Furthermore, in the case where the time when the valve is closed is equivalent, the average amount of suction is more increased when the time, at which the valve is opened, is shorter. This is because that an average value of the maximum amount of instantaneous suction at the time of opening, which is one instantaneously sucked when the valve is opened, is increased.

Example 2

The configuration of the ozone treatment apparatus according to Embodiment 1 is used and the position of the valve to be mounted on the piping coupled to the suction portion of the ejector is changed. Pure water is used as water to be treated and air is sucked as gas. The mounting position of the valve is set at a place just after the suction portion of the ejector and at a place away from the suction portion of the ejector by 1 m. The pure water is made to flow in the ejector at a flow rate of 10 L/min; intermittent suction by opening/closing of the valve is performed; and the average amount of gas, which is sucked from the suction portion of the ejector during one cycle, is measured. In valve operation, intermittent operation which is opened for 2 sec and is closed for two sec is set as one cycle. Furthermore, the average amount of gas, which is sucked from the suction portion of the ejector in a state where the valve is constantly opened, is measured for comparison; and the results thereof is shown in FIG. 17.

An effect is recognized in that, if the length of the piping from the suction portion of the ejector to an intermittent operation portion is prolonged, both the average amount of suction per one cycle and the maximum amount of instantaneous suction at the time of opening are increased and the amount of suction gas is increased. If the valve is closed, gas in the gas piping from the suction portion of the ejector to the intermittent operation portion is exhausted; and thus, the inside of the gas piping from the suction portion of the ejector to the intermittent operation portion is depressurized. After the valve is closed, gas remained in the gas piping from the suction portion of the ejector to the intermittent operation portion is exhausted; and thus, bubbles having smaller diameters are generated. It is conceivable that if the valve is opened, the amount of gas corresponding to the inner volume of the piping is instantaneously sucked. Furthermore, it is conceivable that the maximum amount of instantaneous suction at the time of opening is larger and pressure fluctuation in the suction portion of the ejector is larger when the inner volume of the piping from the suction portion of the ejector to the intermittent operation portion is larger. Consequently, the optimum inner volume of the piping from the suction portion to the intermittent operation portion depends upon the cycle of intermittent suction.

Example 3

The configuration of the ozone treatment apparatus according to Embodiment 1 is used and the excess sludge of the activated sludge tank 43 is introduced to the ejector at 10 L/min, and the sludge is solubilized by setting the ozone injection ratio to 0.04 g-O3/g-SS. A mixed liquor suspended solid (MLSS) concentration of the excess sludge by the activated sludge method is 20000 mg/L. The valve is mounted at a position away from the suction portion by 1 m and the valve is intermittently operated at an interval of 2 sec. The ozone gas concentration is set to 1 vol % and 10 vol % and the MLSS concentration after ozone treatment is measured. Furthermore, for comparison, the MLSS concentration of treated water to which ozone gas of 1 vol % is injected in a state where the suction portion of the ejector is constantly opened is measured.

Figures 18, 19:
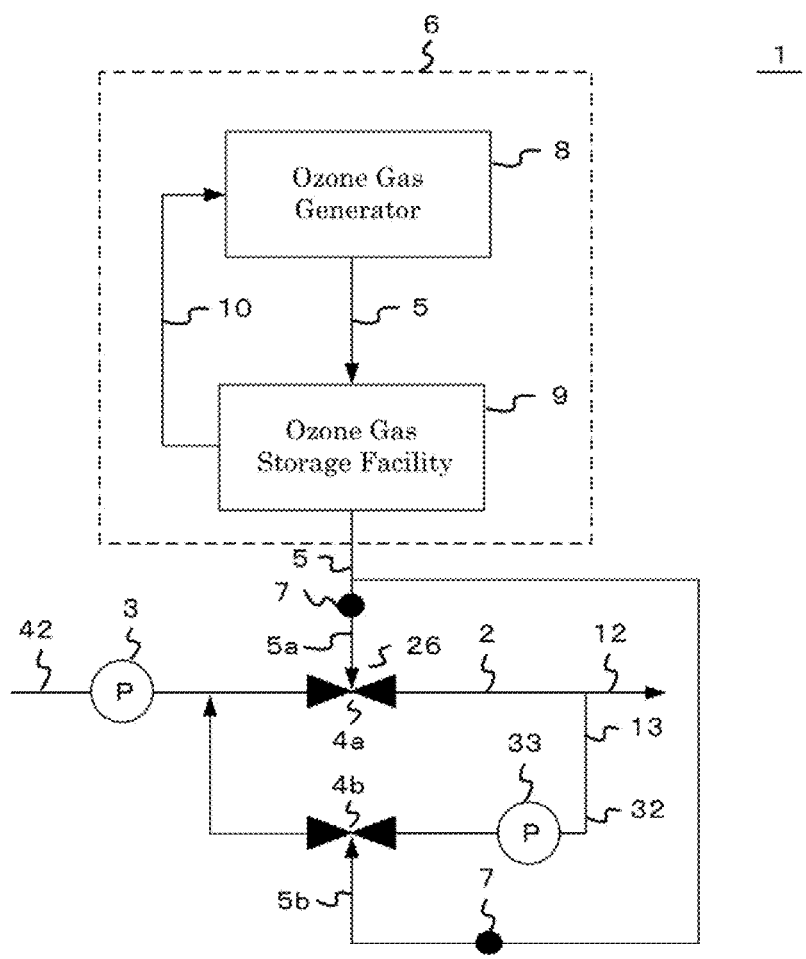
FIG. 18 is a view in which the results of Example 3 of the present invention are compared.
FIG. 19 is a schematic view showing the configuration of an ozone treatment apparatus according to Embodiment 7 of the present invention.

The results thereof is shown in FIG. 18. The MLSS concentration is decreased if the ozone treatment of the excess sludge is performed; and the MLSS concentration of the treated water is more decreased when intermittent suction is performed, as compared to the state where the valve is constantly opened. Furthermore, the MLSS concentration of the treated water is more decreased when the concentration of ozone gas to be sucked is higher. With this manner, intermittent suction is performed from the ejector; and thus, the sludge can be more dissolved; and the higher the ozone gas concentration, the more accelerated the solubilization of the sludge can be performed.

Incidentally, pure water piping having a diameter of 16 mm is connected to the ejector. In Example 1, the pure water is made to flow in the ejector at a constant flow velocity of a flow rate of 5 L/min and air is intermittently sucked from the suction portion of the ejector by switching opening/ closing of the valve. Preferably, the flow velocity of the sludge to be introduced to the ejector is 0.1 m/sec to 3 m/sec; more particularly, preferably, 0.7 m/sec to 1.3 m/sec. The valve 7 is a safety valve that is mechanically opened when the pressure difference in the piping between the ejector 4 side and the ozone gas supplier 6 side is a predetermined value or higher. The chemical liquid valve 18 is a safety valve that is opened when the pressure difference between the chemical liquid ejector 15 side and the chemical liquid tank 17 side is a predetermined value or higher. The valve 7 does not need to be completely blocked, but it may be permissible as long as the flow rate of ozone gas can be changed and the pressure of the suction portion 26 of the ejector 4 can be made to fluctuate. The controller 6a of the ozone treatment apparatus 1 operates the solenoid valve 7d to change the absorption amount of ozone gas every predetermined time.

It is desirable that the length of the time when gas is not sucked by closing the valve 7 is set to the length of the time when the pressure of the gas/liquid mixing portion reaches the pressure P2. The pressure of the gas/liquid mixing portion of the ejector 4 is exponentially decreased by closing the valve 7 of the suction portion 26. Changes in pressure of the gas/liquid mixing portion are approximated by an exponential curve; and preferably, the time when the gas is not sucked is set as 0.1 to 3 times of a time constant of the curve; more particularly, preferably 0.5 times to 1.5 times. This is because that if the time when the valve 7 is closed is prolonged, the ratio of the time when ozone gas per one cycle is not sucked is increased; as a result, the average amount of suction of ozone gas per unit time is decreased. Furthermore, if a period when the valve 7 is closed is short, the pressure of the gas/liquid mixing portion cannot reach P2; and therefore, the suction amount of ozone gas from the suction portion 26 is decreased. Therefore, it is better that the time when the valve 7 is closed is equivalent to or shorter than the time when the valve 7 is opened. For example, in the case where the time when the valve 7 is opened and the time when the valve 7 is closed are set as one cycle, it is preferable that the ratio of the time when the valve 7 is opened with respect to one cycle is set to equal to or more than 50%.

Embodiment 7

FIG. 19 is a schematic view showing the configuration of a sludge treatment system according to Embodiment 7 of the present invention. For example, sludge is used as water to be treated and ozone gas is used as suction gas. This embodiment is characterized in that the sludge piping 2 placed in the latter stage of the ejector of Embodiment 1 is divided into foam recovery piping 12 and liquid recovery piping 13 and the sludge circulation piping 32 of Embodiment 3 is arranged in the liquid recovery piping 13. A sludge circulation pump 33 and the ejector 4 of Embodiment 1 are arranged in the sludge circulation piping 32. Ozone gas piping 5b and a valve 7 are connected to the ejector 4b arranged in the sludge circulation piping 32.

Characteristic operation by the sludge treatment system of this embodiment will be described. The sludge is brought into contact with the ozone gas by the ejector 4a and the sludge is dissolved. A part of the dissolved sludge is circulated in the former stage of the ejector 4a. In this circulation process, foamed sludge and unfoamed sludge are separated; and thus, the sludge can be circulated by the sludge circulation pump 33. The ozone gas is further injected into the unfoamed sludge by the ejector 4b; and thus, solubilization of the sludge can be accelerated. The ozone-treated sludge is circulated and the ejectors 4a and 4b are configured to be continuously arranged; and thus, the time when the ozone comes in contact with the sludge and the injection amount of ozone per unit sludge can be increased. Therefore, decomposition of solid components of the sludge is accelerated to reduce the generation amount of sludge and a recovery rate of phosphorus and the generation amount of digestion gas are increased. Incidentally, in order to separate the foamed sludge and the unfoamed sludge, the configuration may be made such that the sludge mixing tank 31 shown in Embodiment 3 is installed in the latter stage of the ejector 4a and the sludge is drawn from the lower part of the sludge mixing tank 31 to be circulated in the ejector 4b.

Embodiment 8

Figure 20:
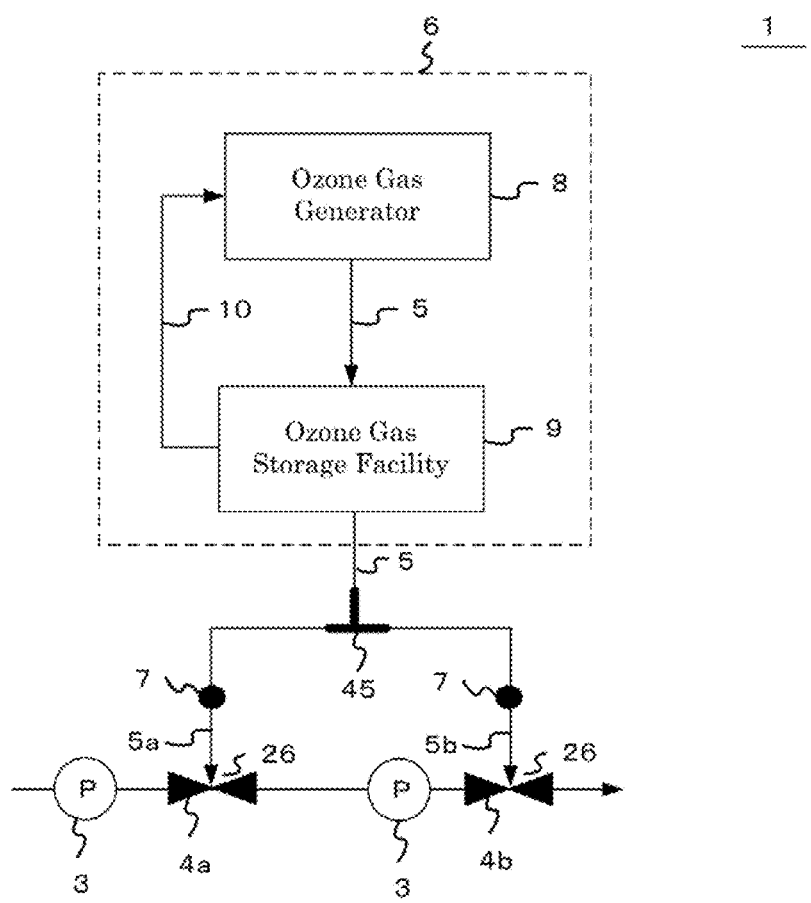
FIG. 20 is a schematic view showing the configuration of an ozone treatment apparatus according to Embodiment 8 of the present invention.

FIG. 20 is a schematic view showing the configuration of a sludge treatment system according to Embodiment 8 of the present invention. For example, sludge is used as water to be treated and ozone gas is used as suction gas. This embodiment is characterized in that a switching valve 45 is arranged at a branch portion of the ozone gas piping 5 of Embodiment 5. A flow path of the ozone gas is switched by ozone gas piping 5a or ozone gas piping 5b by the switching valve 45 arranged in the ozone gas piping 5. Therefore, the switching valve 45 sets a flow-out destination of the ozone gas generated in the ozone gas generator 8 to an ejector 4a (first ejector) or an ejector 4b (second ejector).

Characteristic operation by the sludge treatment system of this embodiment will be described. A period when the ozone gas is sucked and a period when the ozone gas is not sucked at the ejector 4a and the ejector 4b are switched by the operation of the switching valve 45. With this manner, pressure fluctuates at suction portions 26 of the ejectors 4a and 4b and the suction amount of ozone gas into the sludge is instantaneously increased. Solubilization of the sludge is accelerated by a mechanical impact due to the pressure fluctuation of the suction portions 26 and a pull-in of the ozone gas into the inside of sludge flocs 27.

In the present invention, the period when the gas is suctioned and the period when the gas is not suctioned from the suction portions of gas/liquid mixing portions can be switched by mounting valves on the suction portions of the gas/liquid mixing portions. If the suction of gas from the suction portions of the gas/liquid mixing portions is stopped, the pressure of the gas/liquid mixing portions, in which the gas sucked from the suction portions is mixed with the water to be treated, is more decreased when the valves of the suction portions are closed as compared to a state where the suction portions are constantly opened. Subsequently, if the gas is suctioned from the suction portions of the gas/liquid mixing portions, the pressure of the suction portions is once increased to a higher pressure as compared to the state where the suction portions are constantly opened; and then, the pressure of the suction portions is decreased to the pressure in the state where the suction portions are constantly opened.

Further, in the present invention, the pressure fluctuation of the gas/liquid mixing portions is more increased as compared to the state where the suction portions of the gas/liquid mixing portions are constantly opened by intermittently sucking the gas from the suction portions of the gas/liquid mixing portions. In the case where organic liquid containing solid material, for example, sludge is used as the water to be treated, or in the case where the ozone gas is used as the gas, the sludge flocs are physically dispersed by the impact due to the pressure fluctuation of the gas/liquid mixing portions. Furthermore, the pressure of the gas/liquid mixing portions can increase the fluctuation; and therefore, more ozone gas can be sucked into the inside of the sludge flocs. For example, in the case where the ejectors are used by pressurizing the water to be treated, and if the suction of the ozone gas is stopped from the suction portions of the ejectors, the pressure of the gas/liquid mixing portions is more decreased as compared to the state where the suction portions are constantly opened and the sludge flocs are more expanded. When the sludge flocs are expanded, gas components and moisture in the inside of the sludge flocs are pulled out.

After that, if the ozone gas is sucked from the suction portions, the expanded sludge is contracted while pulling the moisture and the gas components around the sludge flocs into the inside of the sludge flocs. This brings the ozone contact with the inside of the sludge flocs to oxidize and decompose the solid components. The pressure fluctuation is increased by intermittent suction and the sludge is more micronized by physical action due to the pressure fluctuation. Further, more ozone gas is pulled into the inside of the sludge flocs to dissolve the sludge and dissolution of the sludge is accelerated.

In the case where the sludge is used as the water to be treated, and if a reaction of the ozone with the sludge is accelerated and the sludge is solubilized, foam that is foamed by the reaction of the ozone with the sludge is more micronized to enhance dispersibility of the sludge. If the foam is micronized, the efficiency of contact between the foam and the sludge is improved and the efficiency of the reaction of the foam with the sludge is further improved. Further, if switching between the suction period and the suction stop period of the ozone gas from the suction portions of the ejectors is repeated, the water to be treated is expanded and contracted correspondingly; and therefore, pulsation is generated in the latter stage of the ejectors. With this manner, organic matter and/or scales in the water to be treated can be suppressed from being attached to the inside of the piping. The valves are mounted on the suction portions of the ejectors; and thus, intermittent injection of the ozone gas is enabled: as a result, a cleaning effect of the piping by the bubbles and the pulsation is obtained.

Incidentally, the present invention can freely combine the respective embodiments and appropriately modify and/or omit the respective embodiments, within the scope of the present invention.

DESCRIPTION OF REFERENCE NUMERALS

1 Ozone treatment apparatus, 2 Sludge piping, 3 Sludge pump, 4 Ejector, 4a Ejector, 4b Ejector, 5 Ozone gas piping, 5a Ozone gas piping, 5b Ozone gas piping, 6 Ozone gas supplier, 6a Controller, 7 Valve, 7d Solenoid valve, 8 Ozone gas generator, 9 Ozone gas storage facility, 10 Oxygen gas piping, 11 Foam recovery apparatus, 12 Foam recovery piping, 13 Liquid recovery piping, 14 Chemical liquid supply apparatus, 14a Controller, 15 Chemical liquid ejector, 16 Chemical liquid piping, 17 Chemical liquid tank, 18 Chemical liquid valve, 18d Chemical liquid solenoid valve, 19 Chemical liquid treatment sludge piping, 20 Sludge concentration treatment apparatus, 21 Concentration sludge piping, 22 Phosphorus recovery treatment apparatus, 23 Phosphorus removal sludge piping, 24 Digestion treatment apparatus, 25 Digested sludge piping, 26 Suction portion, 27 Sludge floc, 28 Bubble, 29 pH adjustment apparatus, 30 pH adjustment sludge piping, 31 Sludge mixing tank, 32 Sludge circulation piping, 33 Sludge circulation pump, 34 Ozone gas buffer tank, 35 Sludge dissolution tank, 36 Dissolved sludge circulation piping, 37 Dissolved sludge circulation pump, 38 Static mixer, 39 Chemical liquid injection pump, 41 Final sedimentation basin, 42 Excess sludge piping, 43 Activated sludge tank, 44 Primary sedimentation basin, 45 Switching valve, 100 Sludge treatment system

The invention claimed is:

1. A sludge treatment system comprising:
    an ozone gas generator that generates ozone gas from raw material gas;
    a first sludge pump that pressurizes sludge to be treated;
    a first ejector in which the sludge to be treated, which is pressurized by said first sludge pump, is injected; and
    a first valve provided between said ozone gas generator and said first ejector,
    wherein said first valve becomes an open state when pressure on a former stage side of the first valve is larger than pressure on a latter stage side of the first valve by a specified value or higher, and
    wherein the former stage side is a side connecting to the ozone gas generator, and the latter stage side is a side connecting to the first ejector.

2. The sludge treatment system according to claim 1, further comprising an ozone gas storage facility between said ozone gas generator and said first valve.

3. The sludge treatment system according to claim 1, further comprising:
    a sludge mixing tank installed in a latter stage of said first ejector; and
    a sludge circulation pump that connects an upper part of said sludge mixing tank and a latter stage of said first sludge pump.

4. The sludge treatment system according to claim 1, further comprising a static mixer placed in a latter stage of said first ejector.

5. The sludge treatment system according to claim 1, further comprising an ozone gas buffer tank between said ozone gas generator and said first valve.

6. The sludge treatment system according to claim 1, further comprising:
a foam recovery apparatus in which ozone-treated material of the sludge to be treated, which is injected to said first ejector, is introduced and the ozone-treated material is separated into foam and liquid; and
a phosphorus recovery treatment apparatus that recovers phosphorus from the foam or the liquid separated by said foam recovery apparatus.

7. The sludge treatment system according to claim 1, further comprising:
a foam recovery apparatus in which ozone-treated material of the sludge to be treated, which is injected to said first ejector, is introduced and the ozone-treated material is separated into foam and liquid; and
a digestion treatment apparatus that performs digestion treatment of the foam separated by said foam recovery apparatus.

8. The sludge treatment system according to claim 1, further comprising:
a foam recovery apparatus in which ozone-treated material of the sludge to be treated, which is injected to said first ejector, is introduced and the ozone-treated material is separated into foam and liquid; and
a chemical liquid treatment apparatus that performs chemical liquid treatment of the foam separated by said foam recovery apparatus.

9. The sludge treatment system according to claim 6, further comprising a concentration treatment apparatus which is arranged in the latter stage of said foam recovery apparatus and concentrates the foam separated by said foam recovery apparatus.

10. The sludge treatment system according to claim 1, further comprising:
a second sludge pump that pressurizes treated-sludge exhausted from said first ejector;
a second ejector in which the treated-sludge, which is pressurized by said second sludge pump, is injected; and
a second valve provided between said ozone gas generator and said second ejector,
wherein treated-sludge, which is exhausted from said second ejector, is injected between said first sludge pump and said first ejector; and
said first valve and said second valve become an open state when pressure on the former stage side is larger than pressure on the latter stage side by a specified value or higher.

11. The sludge treatment system according to claim 1, further comprising:
a second sludge pump that pressurizes treated-sludge exhausted from said first ejector;
a second ejector in which the treated-sludge, which is pressurized by said second sludge pump, is injected; and
a switching valve that sets a flow-out destination of the ozone gas generated by said ozone gas generator to said first ejector or said second ejector.

12. A sludge treatment system comprising:
reforming means that reforms sludge to be treated;
liquid supply means in which the sludge to be treated is pressurized and supplied;
an ejector in which the sludge to be treated, which is pressurized by said liquid supply means, is injected;
a valve provided on piping that connects said reforming means and said ejector; and
a controller connected to the valve,
wherein said valve makes the amount of input of said reforming means into the sludge to be treated in said ejector fluctuate by opening or blocking the piping that connects said reforming means and said ejector during a period when the sludge to be treated is introduced in said ejector, based on a predetermined time of said controller,
wherein said reforming means contains ozone gas or alkaline chemical liquid,
wherein the controller controls to make the valve become an open state when pressure on a former stage side of the valve is larger than pressure on a latter stage side of the valve by a specified value or higher, and
wherein the former stage side is a side connecting to said reforming means, and the latter stage side is a side connecting to said ejector.

13. The sludge treatment system according to claim 12,
wherein the time when the piping that connects said reforming means and said ejector is opened is set to be the same as or larger than the time when the piping is blocked; and
said valve blocks said piping based on a time constant of an exponential curve in which changes in pressure of a gas/liquid mixing portion of said ejector are approximated.

14. A sludge treatment method in which sludge to be treated is pressurized and supplied to mix by an ejector, said sludge treatment method comprising:
during a period when the sludge to be treated is introduced in said ejector,
sucking ozone gas or alkaline chemical liquid, which reforms the sludge to be treated
not sucking the ozone gas or the alkaline chemical liquid; and
switching said sucking and said not sucking,
wherein the amount of input of ozone gas or alkaline chemical liquid, which reforms the sludge to be treated in said ejector, into the sludge to be treated is made to fluctuate by said switching, based on the pressure difference between a former stage side of a valve and a latter stage side of the valve which is mounted on a piping which sucks the ozone gas or the alkaline chemical liquid, and
wherein the former stage side is a side connecting to a side where said ozone gas is sucked, and the latter stage side is a side connecting to said ejector, and
wherein said valve becomes an open state when pressure on the former stage side of the valve is larger than pressure on the latter stage side of the valve by a specified value or higher.

15. The sludge treatment method according to claim 14,
wherein the time of said sucking is set to be the same as or larger than the time of said not sucking; and
the time of said sucking is set based on a time constant of an exponential curve in which changes in pressure of a gas/liquid mixing portion of said ejector are approximated.

* * * * *